United States Patent [19]
Fatt

[11] 3,874,228
[45] Apr. 1, 1975

[54] LENS TESTER

[75] Inventor: Irving Fatt, Berkeley, Calif.

[73] Assignee: The Regents of the University of California, Berkeley, Calif.

[22] Filed: Aug. 20, 1973

[21] Appl. No.: 390,043

[52] U.S. Cl. .................................. 73/94, 73/103
[51] Int. Cl. .............................................. G01n 3/04
[58] Field of Search ....... 73/94, 93, 100, 103, 88 R; 100/194, 208

[56] References Cited
UNITED STATES PATENTS
| | | | |
|---|---|---|---|
| 2,404,584 | 7/1946 | Liska et al. | 73/100 |
| 3,308,654 | 3/1967 | Badgley | 73/94 |

FOREIGN PATENTS OR APPLICATIONS
| | | | |
|---|---|---|---|
| 1,578,580 | 8/1969 | France | 73/94 |

*Primary Examiner*—Jerry W. Myracle
*Attorney, Agent, or Firm*—Lothrop & West

[57] ABSTRACT

A lens tester for ophthalmic lenses includes a supporting frame including frame rods extending generally along an axis and has a plurality of support pins disposed in a predetermined, generally triangular, array and ending in a common plane normal to the axis of the frame. Movable on the frame in an axial direction is a plunger directed toward the support pins and arranged to travel toward and away from the support pins. The plunger has an end contact zone in axial alignment with the center of the pin array. A hydraulically expansible chamber moves the plunger. A lens is supported on the rods between the pins and plunger. If several lenses are so supported, bodies having similar pins and plungers are interspersed with them. Broken lenses are released. Plunger movement may be restricted. Hydraulic pressure is indicated and plunger travel can be limited.

15 Claims, 3 Drawing Figures

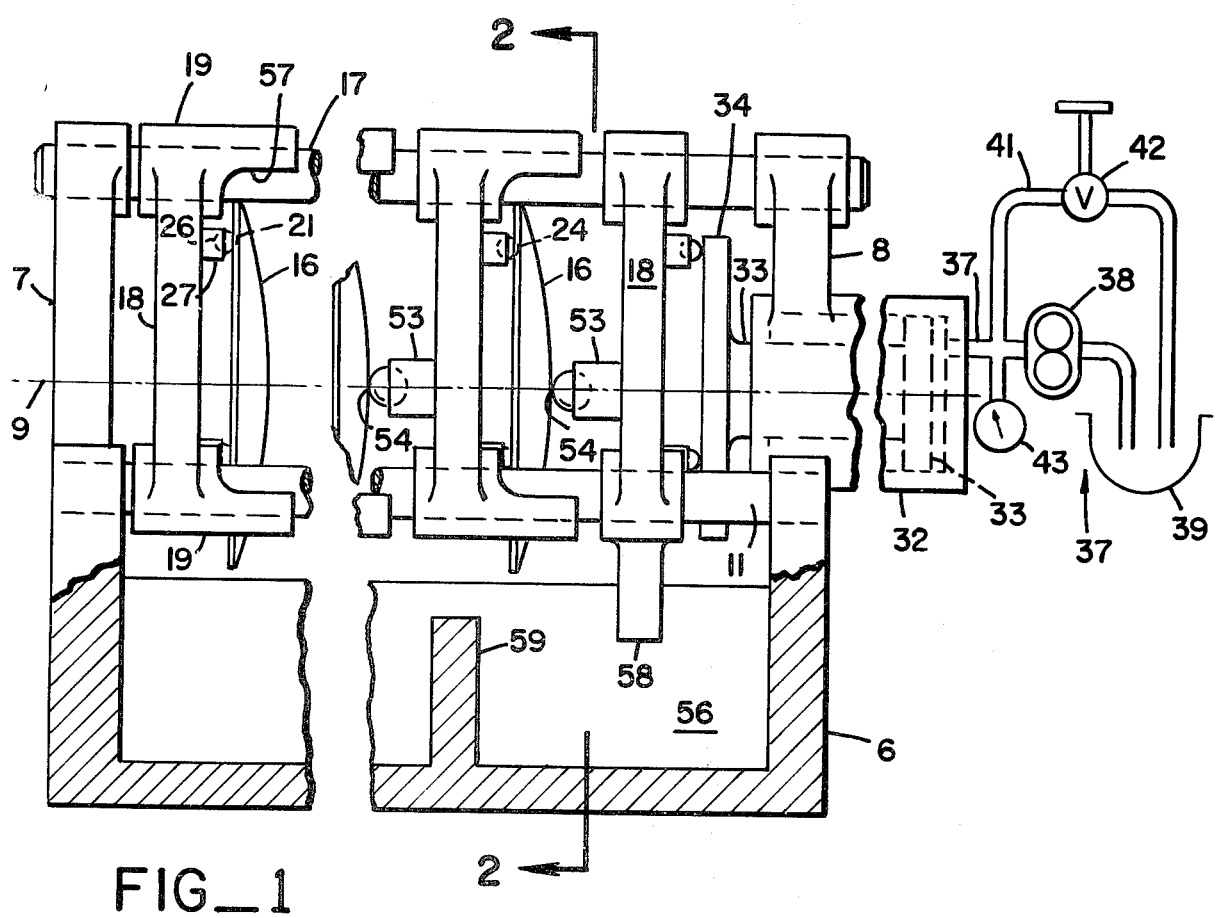
FIG_1
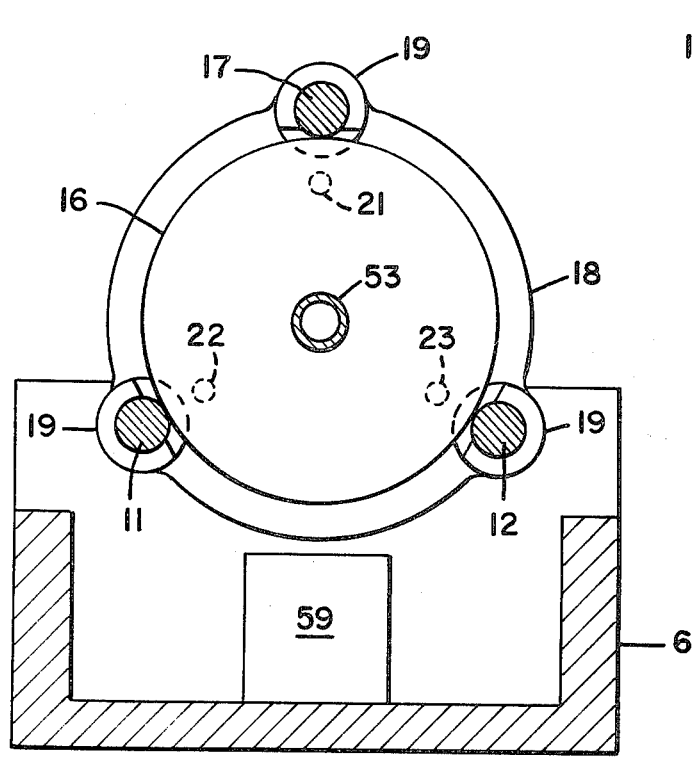
FIG_2
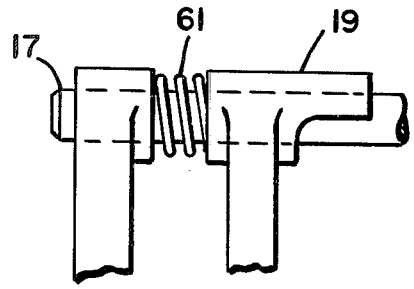
FIG_3

LENS TESTER

In the manufacture of ophthalmic lenses it is of considerable importance to determine or establish the breaking strength of the lenses. It has been determined that lenses of low breaking strength before being tempered or hardened are not substantially improved by the tempering and hardening process. It is equally noted that lenses that are strong before tempering and hardening treatment are made very much stronger by the treatment. It is, therefore, of considerable commercial importance to detect weak lenses at an early stage of manufacture in order that further processing need not be wasted upon them. One of the principal ways of determining lens strength is to subject a lens to a suitable force and to determine whether the lens withstands such force. It is highly important to be able to test a large number of lenses simply, easily and quickly in order that the cost of the testing operation can be substantially reduced or maintained at a low value and to comply with the present law.

It is therefore an object of the invention to provide a lens tester effective to test one or more and preferably a plurality of lenses simultaneously in such a fashion that weak lenses can be easily and promptly eliminated from processing.

A further object of the invention is to provide a lens tester in which all the lenses in a group are subjected to substantially uniform testing in order that a reliable index of their performance can be obtained.

A further object of the invention is to provide a lens tester that can easily be operated by relatively unskilled help.

A further object of the invention is to provide a lens tester which easily affords reproducible results when utilized on a repetitive basis.

A further object of the invention is to provide a lens tester that can easily and economically be provided.

A still further object of the invention is to provide a lens tester that generally is an improvement in the art.

Other objects, together with the foregoing, are attained in the embodiment of the invention described in the accompanying description and illustrated in the accompanying drawings, in which:

FIG. 1 is a side elevation, portions being broken away, of a lens tester pursuant to the invention;

FIG. 2 is a cross-section, the plane of which is indicated by the line 2—2 of FIG. 1; and FIG. 3 is a side elevation of a detail of a modified form of lens tester.

As it has successfully been embodied for use in testing a large number of ophthalmic lenses simultaneously, the test mechanism includes a base 6 designed to be lodged on any suitable support. The base 6 at one end has an upright end wall 7 and a similar, upright end wall 8 at the other end at a predetermined distance from the first wall 7.

Spanning the distance between and secured to the walls 7 and 8 and extending generally in the direction of an axis 9 are rods 11 and 12. These are located on either side of and equidistant from the central axis 9 of the mechanism. The rods 11 and 12 are spaced apart a convenient distance so that they form well separated support points for any one or more, preferably a plurality, of ophthalmic lenses 16 that can be rested on the rods 11 and 12.

Also spanning the distance between the end walls 7 and 8 is an additional rod 17 similar to the rods 11 and 12 and extending parallel thereto. In this instance, the rod 17 is readily removable from the end walls 7 and 8. All of the rods are preferably covered with an anti-friction coating such as "Teflon."

Axially movable on the rods 11, 12 and 17 are one or more similar sliders 18. Each slider is a disc having three rod-engaging bosses 19 equally spaced around its periphery. The bosses 19 may be integral with the sliders 18, as shown, or may be separate spacers. Also, the sliders 18 may be slotted so they can be transversely lifted from the rods 11 and 12 when the rod 17 is withdrawn.

Projecting from each slider on the side toward the wall 8 are three support pins 21, 22 and 23 arranged equidistantly from the axis 9 or center and arranged equidistantly from each other. The pins can be provided in any suitable number but preferably three are utilized in order to afford, in effect, a tripod support. Each of the pins is like the others and preferably has a rounded end 24 preferably of a spherical configuration. Conveniently, this is made of a ball 26 embedded in a pin shank 27 and thus economically affording a hard spherical end. All of the pin ends lie in a common, transverse plane.

The end wall 8 serves as a support for a hydraulic cylinder 32 within which a plunger 33 is axially reciprocable. The plunger has a connector 34 abutting the pins 21, 22 and 23 of the adjacent slider 18 and is movable along the axis 9. The plunger is operated by hydraulic fluid supplied to the cylinder 32 by a hydraulic system 37 including a pump 38, appropriately driven, and supplied with hydraulic fluid from a sump 39. There is a bypass 41 around the pump 38 with a relief valve 42 which can be set to any desired value. There is also a pressure gauge 43 effective to display the pressure within the cylinder 32.

Each slider 18 slides freely on the rods 11, 12 and 17 under the influence of the plunger 33. On the side opposite the pins 21, each slider has a central boss 53 thereon axially aligning with the plunger 33. The boss 53 is provided with a similar, hard spherical contact portion 54, as previously described.

In the operation of this structure the hydraulic mechanism is put into operation and the plunger 33 is withdrawn toward the right-hand end or toward the wall 8 to afford maximum space. The upper rod 17 is temporarily removed. Interposed between each of the sliders are lenses 16. The planes of the lenses extend generally normal to the axis 9. The lenses and the ends 24 and 54 are arrayed in almost immediate contact. When the lenses have all been rested upon the rods 11 and 12, the removable rod 17 is restored to serve as an enclosing or top-restraining member for the lens group.

The hydraulic mechanism is then actuated in order to supply fluid to the cylinder 32 under a predetermined maximum pressure, for example. The plunger 33 is thus advanced along the axis toward the wall 7. At first the plunger moves all of the sliders 18 and lenses 16 toward the left until they are in precise contact. The pressure then builds up and exerts a maximum test load on each of the lenses. Assuming that all of them are strong enough to take the full, hydraulic load, there is no further consequence and the test can be discontinued by relaxing the hydraulic pressure, then removing the top rod and lifting out the tested lenses, extracting the lenses from between the sliders for further handling.

On the other hand, if during the operation one or more of the lenses fails, then it shatters into pieces which fall down into a reservoir 56 in the base 6. The remaining lenses, however, are subjected to further operation of the test since, as any broken lenses fall into the reservoir, the plunger takes up the slack and continues along its axial travel to exert pressure on the remaining devices. The test can be operated either by setting the pressure so that a predetermined fraction of the total tested lenses, say 10 per cent, breaks or can be operated at a predetermined set pressure effective or ineffective to break the lenses. In a preferred operation a large number, for example, 100 lenses are tested at each operation.

Since, when a lens breaks there can be substantial plunger travel until the next solid lens resists the plunger pressure, I prefer to limit such travel by elongating the bosses 19 to allow only a short space between them and to provide cut-aways 57 to allow proper lens positioning despite the elongated bosses. In this way, when a lens breaks, the end 54 does not travel to the next slider 18 and abut it to allow pressure buildup but rather the bosses 19 travel just a few thousandths of an inch and transmit pressure with only a short travel.

The first of the sliders 18 can be provided with a lug 58 positioned to abut a stop 59 after a certain plunger travel. The distance between the lug and the stop may represent the plunger travel for a predetermined number of broken lenses an can thus limit the breakage to a predetermined fraction of the whole.

Even though the slider travel on lens breakage may not be much, it may impose some unwanted shocks so, as shown in FIG. 3 as an example, a cushion spring 61 can be interposed between one boss 19 and the next to yield slightly and cushion shock between the sliders and between the end slider and the end wall.

At the conclusion of the test, the lenses are removed from the machine after the hydraulic pressure has been relaxed, the sliders are axially spread and the machine is ready for further use.

What is claimed is:

1. A lens tester comprising a frame extending along an axis, means on said frame providing a support having a contact surface located in a plane normal to said axis, a plunger having a contact end, means for mounting said plunger for axial movement on said frame toward and away from said support and with said contact end in a plane normal to said axis, means interconnecting said frame and said plunger for so moving said plunger, and a slider mounted on said frame for sliding movement in the direction of said axis and disposed between said support and said contact end.

2. A lens tester as in claim 1 in which said slider has a center and in which support pins are provided on said slider equally spaced from said center and equally spaced from each other.

3. A lens tester as in claim 2 in which said slider has three of said support pins projecting from one side thereof.

4. A lens tester as in claim 2 in which at least one of said support pins has a hard metal spherical end.

5. A lens tester as in claim 1 in which said slider has a central boss on one side and a plurality of support pins on the other side.

6. A lens tester as in claim 1 in which said frame includes an axially extending rod.

7. A lens tester as in claim 6 in which said frame includes a plurality of said rods and at least one of said rods is detachable from said frame.

8. A lens tester as in claim 6 in which said slider is axially slidable on said rod.

9. A lens tester as in claim 8 in which said slider has a plurality of support pins projecting from a face thereof.

10. A lens tester as in claim 8 in which said slider has a peripheral boss extending therefrom to abut a peripheral boss on a similar adjacent slider.

11. A lens tester as in claim 8 in which said slider has a plurality of support pins projecting axially from one face thereof, and has a central boss axially extending from the other face thereof, and has at least one peripheral boss projecting axially from the periphery thereof.

12. A lens tester comprising a frame extending along an axis, a support rod on said frame extending parallel to said axis, a slider movable along said support rod, means for so moving said slider, means on said slider for abutting a lens supported on said frame, and means on said rod for limiting said movement of said slider along said support rod.

13. A lens tester as in claim 12 in which said limiting means includes a peripheral boss on said slider.

14. A lens tester as in claim 12 in which said slider is transversely removable from said frame.

15. A lens tester as in claim 12 in which said limiting means includes a spring.

* * * * *